Jan. 4, 1966   E. H. TERLINDE   3,227,412
HOOK FOR APERTURED PANEL
Filed June 3, 1963

Inventor
EDWARD H. TERLINDE
By Robert M. Dunning
ATTORNEY

United States Patent Office 3,227,412
Patented Jan. 4, 1966

3,227,412
HOOK FOR APERTURED PANEL
Edward H. Terlinde, 222 W. 7th St., St. Paul 2, Minn.
Filed June 3, 1963, Ser. No. 285,062
10 Claims. (Cl. 248—223)

This invention relates to an apertured panel hook or bracket having locking means whereby the hook may be releasably engaged to the apertured panel so as to prevent the hook or bracket from being inadvertently dislodged from its position.

The use of apertured panels and hooks and brackets to support and display articles on the panel has proven to be quite popular. In the use of the conventional apertured panel hooks, some apparent disadvantages of the present construction have arisen. In general, the main source of difficulty for conventional hooks lies in the likelihood of the hook to be either displaced laterally on the panel, or to be subject to being pulled loose from the panel itself.

Apertured panel hooks in general are constructed in the form of an elongated shank designed to overlie the base surface of the apertured panel, one end of the shank having an offset end portion designed to be inserted into an aperture in the apertured panel to overlie the opposed surface of the panel to hold the hook in engagement overlying the panel. In general, a support element is placed on the shank at the other end and in many instances, the support end is merely a counterturned or angle portion of the shaft itself. Articles are placed upon or suspended from the support ends of the hooks for display purposes. However, the hooks are readily moved laterally thereby causing the suspended articles to be dislodged, or the hooks themselves to be pulled from the panel to which they are attached.

It is an object of the present invention to provide an apertured panel hook having locking means whereby the hook may be detained in releasable engagement with an apertured panel and thereby being prevented from being inadvertently moved laterally or otherwise disengaged from the panel.

It is a further object of the present invention to provide a hook having locking means based from the offset shank end and insertable in an aperture spaced from the aperture through which the offset shank end is engaged, to hold the hook in engagement with the panel.

It is a further object of the present invention to provide locking means for an apertured panel hook whereby the hook may not be removed from the panel inadvertently due to tab members which hold the panel in locked relation between the tab members and the overlying shank.

My apertured panel hook in one preferred construction embodies a shank having a pair of sides with each side having a tab projecting rearwardly therefrom in aligned spaced relationship to the other tab, the tabs having opposed lateral projection whereby when the tabs are inserted into an aperture of the apertured panel the lateral projections hold the panel between the tab projections and the shank. In order to insure a more positive lock, the spaced tabs are in springably compressible relationship to each other. A wedge member is pivotally secured between the sides of the shank in such a manner as to be pivotally movable into and out of a wedge relationship between the said tabs to hold the tabs engaged in the panel aperture in wedgedly spaced-apart relation.

Whereas it has been a common occurrence for apertured panel hooks to become dislodged, with my apertured panel hooks the user discovers that the hooks will not pull loose regardless of the weight of the articles suspended from them. Accordingly, it is an object of the present invention to provide an apertured panel hook having locking means whereby the hook will remain in locked engagement with a panel regardless of the weight of the articles suspended from the hook.

It is a further object of the present invention to provide an apertured panel hook whereby lateral urging of the hook causes the locking means to more tightly engage the apertured panel so as to prevent the hook from becoming disengaged.

The hook is adapted to be made of conventional materials and because of the locking feature, it is possible to have hooks which are considerably elongated in length and to have more than one supporting member secured to the base surface of the shank. The hooks may be used in shelved relation if desired with panels placed on the support members in a manner similar to shelving without danger of the hooks becoming disengaged.

The hooks are low in cost, readily manufactured, and particularly adapted for a wide variety of use since the support projection regardless of its angle or curvature will not interfere with the locking feature of the hook.

These and other objects and more particular advantages will be further detailed and described in the accompanying specifications taken in connection with the drawings herein in which.

As will be generally understood, my invention is designed to be used in conjunction with an apertured panel and to be secured in overlying relationship to the apertured panel so as to provide a support for the display of various articles, to make it possible for the user to arrange articles on an apertured panel surface in any desired manner and to provide means of support for shelves and the like. As preferably constructed, my invention is made of any suitable material which will provide the strength necessary for the support members projecting from the shank of the hook.

Figure 1:
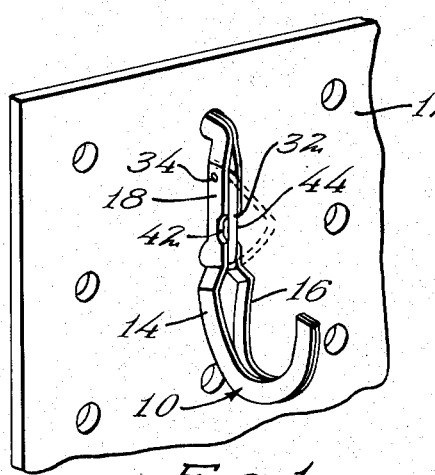
FIGURE 1 is a perspective view of a hook in secured relation overlying an apertured panel illustrating one form of the pivotally movable wedge member.

FIGURE 1 discloses an apertured panel hook generally numbered 10 in secured relation to an apertured panel 12 having aligned spaced apertures extending through the panel between opposed surfaces of the board. As apertured panels are in quite common use and generally understood, further description of the panel to which the hook is designed to be secured is not felt to be necessary.

The apertured panel hook 10 is comprised of a pair of side members 14 and 16 which may be taken together collectively and be generally termed as the shank of the hook.

Figure 2:
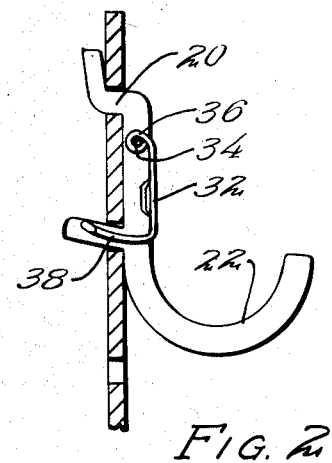
FIGURE 2 is a view in section of the hook in engagement with an apertured panel, the hook being the hook of FIGURE 1.
Figure 7:
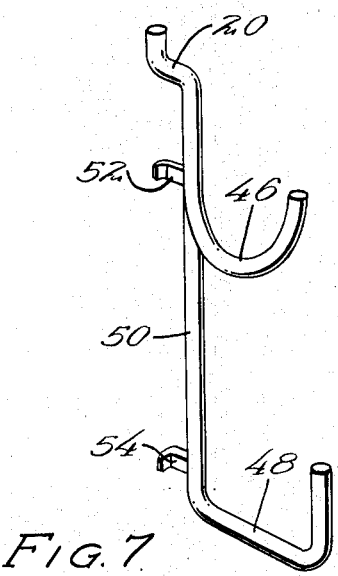
FIGURE 7 is a perspective view of a modified form of my apertured panel hook having an elongated shank portion and a plurality of support members projecting from the shank.

For purposes of description, the side members 14 and 16 as singularly described as the shank is numbered 18. The side members comprising the intermediate portion of the shank 18 may be secured together at any convenient point by welding or other suitable means of securing the side members 14 and 16 together. As may be clearly seen in FIGURE 2, one end portion of the shank is offset as indicated at 20 to provide a rearwardly offset portion designed to be inserted through an aperture in the apertured panel to hold the shank in overlying relationship to the panel. The opposed end of the shank 18 is provided with a support member 22 which projects forwardly from the shank. As will be understood, and as may be clearly seen in FIGURE 7, although I have described the support member as being secured to an end of the shank 18, it is obvious that the support member may be secured at any desired position along the shank within reasonable limits of course.

The hook 10 is held in locked engagement with the apertured panel so as to prevent inadvertent lateral movement or pulling of the hook from the panel by locking means projecting from the rear of the shank and designed to be inserted in an aperture spaced from the aperture through which the offset portion of the shank was inserted.

Figure 3:
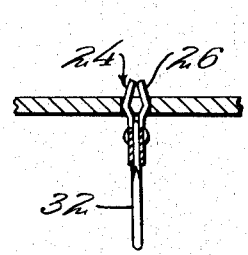
FIGURE 3 is a view in section showing the compressible relation of the tab members during insertion into an aperture of the apertured panel.
Figure 4:
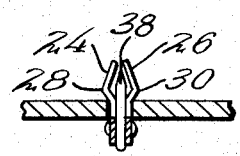
FIGURE 4 is a view in section of the tab members in spaced apart locked engagement in an aperture of the apertured panel, the pivotal wedge member holding the tabs in spaced apart relation.

As may be seen in FIGURES 3 and 4, each side member of the shank 18 is provided with a rearwardly extending resilient tab 24 and 26, respectively, designed to be inserted into an aperture in the apertured panel. As will be apparent the tabs are in spaced relationship to each other and have opposed laterally extending portions for a purpose which will be more fully described.

In the preferred construction, the tabs are of sufficient length so as to extend through the aperture with the laterally extending opposed portions of the tabs projecting beyond the rear periphery of the aperture so as to provide an overlap of the tabs over the rear apertured panel surface to hold the hook in engagement on the apertured panel. As is obvious from the drawings of FIGURES 3 and 4 the spaced opposed tabs are compressed toward each other for insertion into the aperture of the apertured panel, and when the tabs have projected beyond the aperture, they springably separate from their previous compressed relationship.

While under ordinary circumstances, the overlying relationship of the laterally offset tab portions 28 and 30 would be sufficient to hold the hook 10 in secured relationship to the panel; however, since the hooks are designed to support objects without the possibility of being inadvertently unsecured from the panel, I have provided a wedge member 32 designed to be moved into and out of wedged relation between the two opposed tabs. As may be seen in FIGURE 3, the wedge member 32 is spaced apart from the tabs when they are inserted into the aperture of the apertured panel, and after the tabs are in overlying relationship to the rear surface of the panel, the wedge lock 32 is inserted between the tabs to hold them in wedgedly spaced apart relationship. As will be quite obvious, the hook 10 is incapable of being dislodged or separated from the apertured panel while the wedge locking member 32 is in position between the tabs without structurally damaging the panel.

I have found that the wedge member 32 may be secured to the shank in a variety of manners each of which has some particular advantages. For example, FIGURE 1 illustrates the wedge member 32 pivotally secured at one end of the wedge by a pin 34 between the side members 14 and 16 of the shank. As may be seen in FIGURE 2, the wedge member has a coiled end 36 through which the pin 34 is designed to extend with the end of the pin secured in spaced aligned apertures of the side members 14 and 16 as will be readily understood. The wedge member 32 is designed to lie in semiconcealed position axially between the side members 14 and 16 when the wedging end 38 of the wedge 32 is inserted between the tabs 24 and 26. In this position with the hook secured on the panel, the exposed surface of the hook presents a flush appearance which is not only attractive but which is functional as well since the wedge 32 does not take up any space which could be used for display purposes. In actual construction, the wedge 32 is composed of the same materials as the other portions of the hook 10, but it has proven highly attractive to use wedge members of different colorations and of different material from the remainder of the hook in order to provide an artistic variation in what would otherwise be rather drab fastening devices.

In the hook shown in FIGURE 1 a relatively cheap construction is obtained through the use of a pair of stamped side members which are secured together in spaced relationship at the offset end and at the opposed end of the hook. It has been found that for some purposes an increased stability of the hook overlying the apertured panel surface may be obtained by spacing the side members wider apart as may be seen in FIGURE 1.

To some extent the hook secured to an apertured panel which has been used with some frequency, will tend to move slightly back and forth due to the amount of play between the offset end and the locked portion of the hook as they are secured in apertures which have become enlarged through usage. It has been found that this tendency of a hook to move rather slightly may be controlled by spacing the side members farther apart which prevents the hook from pivoting in the apertures in which the offset end and the lock tabs are secured. As will be apparent under such circumstances when the hook is to be secured to an apertured panel, the offset end 20 is inserted into its particular aperture and then the side members of the hook are compressed together which in turn compresses the tabs 24 and 26 together so that they may be inserted into an aperture spaced from the aperture through which the offset end 20 was inserted.

In the preferred construction, the wedge 32 as has been previously mentioned, lies in at least partially concealed relation between the side members 14 and 16. In order to enable the wedge to be retracted from the locking position between the tabs, I have provided a pair of recesses 42 and 44 in the forward edge surfaces of the side members, respectively, to enable the wedge to be grasped and retracted from its locking position. In actual manufacture, the wedge 32 is a rod which is bent into the desired shape so as to provide an end which may be pivotally secured such as 36 and a wedge 38 to be inserted between the tabs.

As will be understood, the support ends 32 are primarily outwardly projecting extensions from the shank and may be of any desired length or shape to suit the needs of the user. For example, as may be seen in FIGURE 7, the support ends may be arcuately counterturned or may be substantially straight projections from the shank with upturned ends such as 46 and 48. I have found that where it is desired to use a relatively permanent installation, that considerable success is achieved through the use of the structure shown in FIGURE 7. As is apparent with this construction, a single hook may be used as the means of space support for several items, and while I have shown a pair of support members 46 and 48 in relationship to a shank 50 and spaced hook shaped tabs 52 and 54, it is not my intention to limit construction to this structure alone. It is obvious, of course, that hooks utilizing the basic structure of my invention may be of considerable length with a plurality of support elements and locking means in order to provide hook structures designed for particular purposes.

Figure 5:
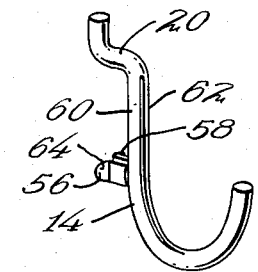
FIGURE 5 is a view of a modified shank.

I have found that for some purposes, a variation in the actual shape of the tabs may be advantageous from the standpoint of manufacture. As may be seen in FIGURE 5, tabs such as 56 and 58 in spaced relation projecting from the sides 60 and 62 may consist of a relatively straight member having a laterally disposed end or wing tip. It will be understood that the wing tip such as 64 and the opposed wing tip (not shown) have their tips extending in opposite directions so as to overlie the rear surface of the apertured panel to prevent the hook from being inadvertently pulled off the panel. As with the other type of tab, the tabs are compressed together in order to enable them to be inserted into the aperture, and upon their insertion into the aperture they spring apart so that their wing tips overlie the panel.

It will be obvious that the wedge serves a dual purpose in that it prevents the tab members from being withdrawn from the aperture in which they are inserted inadvertently, and in addition, the wedge urges the tab against the sides of the aperture so as to provide a more positive lock than could otherwise be secured. As will be apparent in addition, it is possible to secure the wedge member 32 in a variety of pivotal positions in relationship to the tab members so as to adequately perform its function, but as such placement would be believed to be obvious, for the description is felt to be unnecessary.

Figure 6:
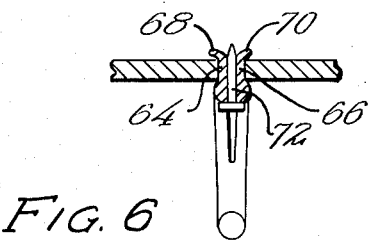
FIGURE 6 is a view in section of the tab members of the shank of FIGURE 5 in secured relation to an apertured panel, the tabs being held in spaced apart relation by a wedge member.

FIGURE 6 discloses the relationship of the tab members 64 and 66 having wing tips 68 and 70 held in spaced apart relation by an axially slidable wedge locking member 72 and as may be seen from a close examination of the illustrations of FIGURES 3, 4, and 6, the laterally displaced portions of the tab are purposely angled so as to have the angled portions of the tabs bear against the edge of the aperture in which the tabs are inserted when the tabs are in wedged-apart relation. In this position, the laterally displaced portions frictionally engage against the edge of the apertures to more positively prevent movement of the hook in any direction even in the case of apertures which have become enlarged through repeated use.

It will be obvious, therefore, that the hooks may be made in one piece such as the hooks shown in illustrations 5 and 7, or may be made from a pair of stamped or molded pieces of metal, plastic, or other suitable material and then secured together along their ends or at any other convenient points to provide the apertured panel hook.

I have endeavored to set forth the best embodiments of my invention, and believing that further modification would be obvious and description therefore unnecessary, I desire to have it understood that obvious changes may be made within the scope of the accompanying claims without departing from the spirit of my invention.

I claim:
1. An apertured panel hook adapted to overlie a face surface of an apertured panel having spaced apertures therethrough comprising:
  (a) a shank,
  (b) said shank including at one end an axially aligned rearwardly offset portion adapted to extend through one said aperture and to overlie another apertured panel surface to attach said hook to said apertured panel, and a forwardly projecting portion adapted to serve as a support for items engaged therewith,
  (c) lock means secured to said shank to lock said apertured panel hook in overlying engagement to said panel, said lock means including at least one rearwardly extending tab means adapted to extend through an aperture spaced from said one said aperture in said apertured panel, and means to urge said tab member into locking engagement against the side of said aperture,
  (d) said shank including a pair of opposed spaced side members, at least one tab means secured to each said side, and a wedge member pivotally secured to said shank and movable between said tabs to urge said tabs into wedged apart engagement against the side members of said aperture.

2. An apertured panel hook adapted to overlie a face surface of an apertured panel having spaced apertures therethrough comprising:
  (a) a shank,
  (b) said shank including at one end an axially aligned rearwardly offset portion adapted to extend through one said aperture to overlie another apertured panel surface to attach said hook to said apertured panel, and a forwardly projecting portion adapted to serve as a support for items engaged therewith,
  (c) lock means secured to said shank to lock said apertured panel hook in overlying relation to said panel, said lock means including a pair of tabs adapted to extend through an aperture in said panel spaced from said one aperture in said apertured panel, and wedge means movable between said tabs to urge said tabs into wedged apart engagement against the sides of said aperture, said wedge means extending through said aperture spaced from said one aperture.

3. The structure of claim 2 and in which said tabs are resilient.

4. An apertured panel hook adapted to overlie a face surface of an apertured panel having spaced apertures therethrough comprising:
  (a) a shank,
  (b) said shank including at one end an axially aligned rearwardly offset portion adapted to extend through one said aperture to overlie another apertured panel surface to attach said hook to said apertured panel, and a forwardly projecting portion adapted to serve as a support for items engaged therewith,
  (c) said shank including a pair of opposed spaced side members secured together near an end thereof,
  (d) lock means secured to said shank to lock said apertured panel hook in overlying relation to said panel, said lock means including a tab on each of said shank side members and extendable through an aperture spaced from said one aperture in said apertured panel, and a wedge member movable between said tabs to urge said tabs into wedged apart engagement against the sides of said aperture.

5. The structure of claim 1 and in which said wedge member is pivotally mounted between said side members, said wedge member being pivotally movable into and out of a wedge relation between said tabs.

6. The structure of claim 1 and in which each said tab means includes a laterally extending portion adapted to overlie said opposed apertured panel surface.

7. An apertured panel hook adapted to overlie a face surface of an apertured panel having spaced apertures therethrough comprising:
  (a) a shank including at one end an axially aligned rearwardly offset portion adapted to extend through one said aperture to overlie the other apertured panel surface, and a forwardly projecting portion adapted to serve as a support for items engaged therewith,
  (b) at least a portion of said shank including a pair of opposed spaced resilient side members,
  (c) said opposed sides including at least a pair of rearwardly extending tabs adapted to be compressed to a side by side relation for insertion through an aperture spaced from said one aperture,
  (d) said tabs including oppositely disposed portions whereby when said tabs are inserted into an aperture, said oppositely disposed portions are engageable against the sides of said aperture to hold said shank in overlying engagement with said apertured panel.

8. The structure of claim 7 and in which said side members are in spaced opposed relation intermediate said rearwardly offset portion and the other end of said shank whereby said side members are adapted to lie in spaced overlying relation to said face surface.

9. The structure of claim 8 and in which an intermediate portion of each said side members are oppositely laterally disposed from said side members.

10. The structure of claim 8 and in which said tabs have oppositely laterally angled end portions adapted to overlie said other apertured panel surface.

(References on following page)

References Cited by the Examiner

UNITED STATES PATENTS

| | | | |
|---|---|---|---|
| 1,902,241 | 3/1933 | Jones | 248—340 |
| 1,976,889 | 10/1934 | Place | 248—361 |
| 2,118,800 | 5/1938 | Smith | 248—361 |
| 2,166,916 | 7/1939 | Lombard | 24—73.7 |
| 2,267,379 | 12/1941 | Tinnerman | 248—361 |
| 2,312,985 | 3/1943 | Bales | 248—223 |
| 2,498,623 | 2/1950 | Poupitch | 248—235 |
| 2,790,616 | 4/1957 | Cardinal | 248—217 |
| 2,894,241 | 7/1959 | McKee | 339—17 |
| 2,959,389 | 11/1960 | Richter et al. | 248—340 |
| 3,031,161 | 4/1962 | Howie | 248—223 |
| 3,037,733 | 6/1962 | Roman | 248—223 |

CLAUDE A. LE ROY, *Primary Examiner.*